T. W. BIBB.
OHMMETER.
APPLICATION FILED JULY 27, 1911.
1,049,040.
Patented Dec. 31, 1912.
2 SHEETS—SHEET 1.
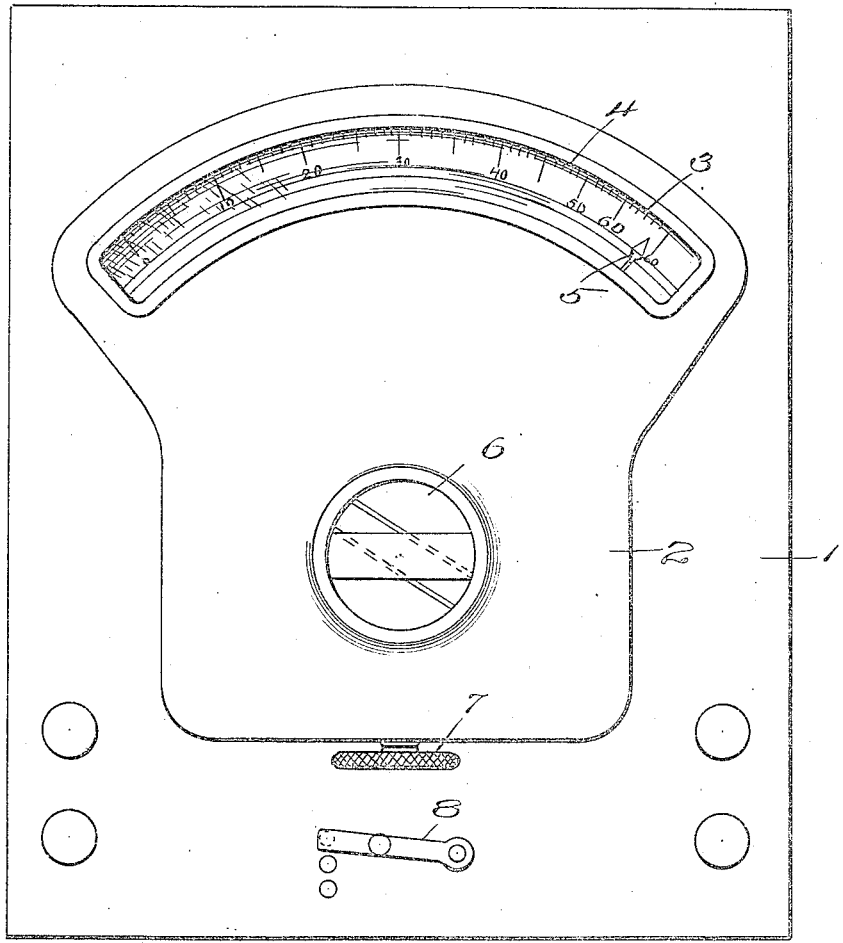
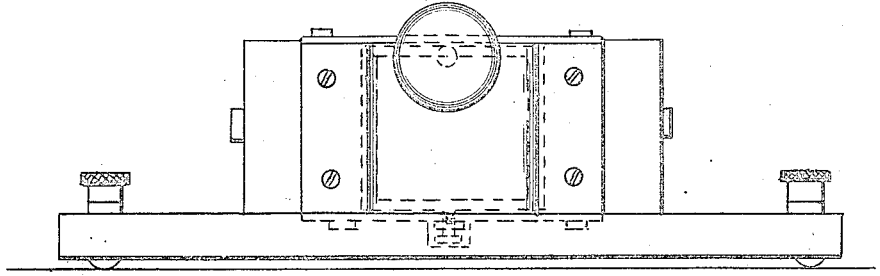

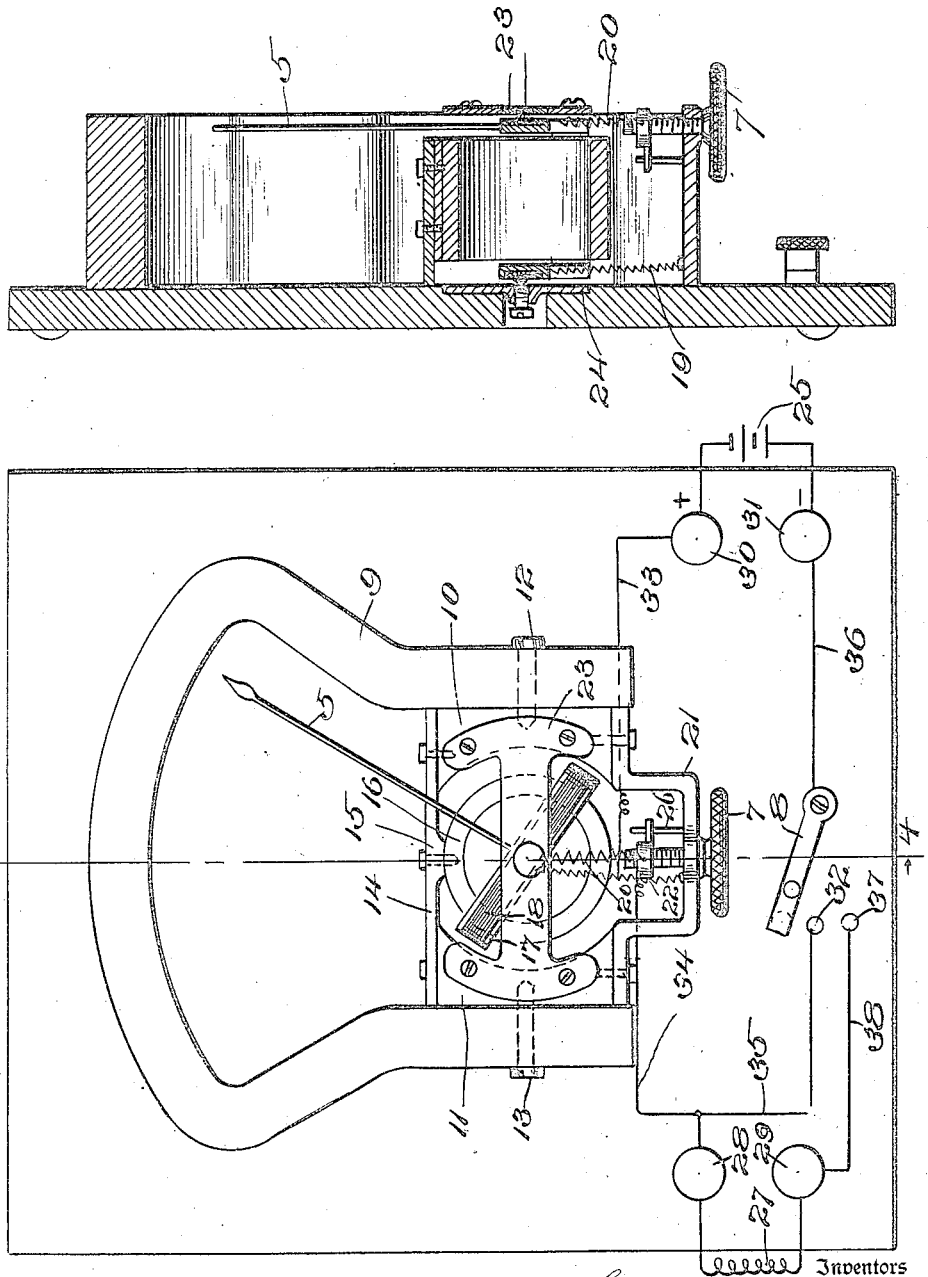

UNITED STATES PATENT OFFICE.

THOMAS WILLIAM BIBB, OF SEATTLE, WASHINGTON.

OHMMETER.

1,049,040.

Specification of Letters Patent. Patented Dec. 31, 1912.

Application filed July 27, 1911. Serial No. 640,823.

*To all whom it may concern:*

Be it known that I, THOMAS W. BIBB, a citizen of the United States, residing at Seattle, in the county of King and State of Washington, have invented certain new and useful Improvements in Ohmmeters; and I do hereby declare the following to be a full, clear, and exact description of the invention, such as will enable others skilled in the art to which it appertains to make and use the same.

This invention relates to improvements in electrical measuring instruments, and particularly to what might be called ohmmeters, and has for an object the arrangement of improved means whereby an unknown resistance may be tested for indicating the ohmic resistance thereof, which resistance will be indicated on a suitable scale.

Another object of the invention is the arrangement of improved means which may utilize a current supply with varying voltage for testing the ohmic resistance of an unknown instrument or resistance by a proper adjustment of certain parts for adapting the device to the particular voltage used.

A still further object of the invention more specifically is the arrangement of an adjustable retractile spring designed to act against the testing voltage.

With these and other objects in view the invention comprises certain novel constructions, combinations, and arrangement of parts as will be hereinafter more fully described and claimed.

In the accompanying drawings: Figure 1 is a top plan view of an embodiment of the invention. Fig. 2 is an end view of the structure shown in Fig. 1. Fig. 3 is a view similar to Fig. 1 with the housing removed and the wire connections shown. Fig. 4 is a section through Fig. 3 on line 4—4.

In constructing a device embodying the invention many of the principles of the galvanometer and other similar instruments are used, but rearranged and modified or changed and associated with new features so that the device may be adjusted for use with electrical current of different voltage for testing the ohmic resistance of any desired device. The indicating member is used to show exactly the ohmic resistance desired, and is controlled or adjusted to the voltage used in the meter by a suitable tension spring which is designed to hold the indicating arm at zero and which may be adjusted to bring the arm to zero when not at that place.

In order that the invention may be more clearly understood an embodiment of the same is shown in the accompanying drawings, in which 1 indicates a base of wood or other desired material upon which is mounted a housing 2. Housing 2 is provided with a glass covered opening 3 for disclosing the scale 4 and the end of arm 5. A glass covered opening 6 is also provided for disclosing the pivotally mounted coil so as to observe whether the same is acting properly. Housing 2 is screwed together or otherwise secured as may be desired, and is adapted to contain all of the moving parts of the device, except the thumb member of an adjusting screw 7, and a switch member 8. Arranged in housing 2 is a permanent magnet 9 having pole pieces 10 and 11 formed of soft iron. The pole pieces or extensions 10 and 11 are secured in place by suitable screws 12 and 13 and have in turn secured thereto a brass plate 14 which is held in place by suitable screws passing through the plate into the pole pieces 10 and 11. Plate 14 has an extension 15 which is arranged to fit against the periphery of a cylinder 16 formed of soft iron.

The inner ends of the pole pieces 10 and 11 are formed arc shaped so that between the pole pieces and cylinder 16 is an opening in which a spool 17 may move. By this arrangement a good constant magnetic field is provided for spool 17 so that coil 18 wound thereon will be influenced by the field. Spool 17 is made of brass and is mounted preferably in agate bearings, one of which is preferably adjustable so as to properly balance and support the spool 17. Spool 17 has connected therewith a pair of springs 19 and 20. The lower spring 19 is a comparatively weak spring and is so connected with the spool 17 and with a substantially U-shaped plate 21 as to normally cause the arm 5 to take the position shown in Figs. 1 and 3. The upper spring 20 is also arranged to act in conjunction with spring 19 for holding arm 5 in the position shown in Figs. 1 and 3. Spring 20 is connected at one end to the spool 17 and at the other end to a reciprocating member 22 which has a threaded aperture therein for accommodating the threaded portion of thumb screw 7 so that whenever thumb screw 7 is rotated member 22 will be adjusted toward or from the spool 17. In this way the spring 20 may be adjusted so as to resist to any desired extent movement of arm 5 from the right to the left. In connection with the cylinder 16 and the spool 17 it will be noted that the centers of the same are concentric and the bearing members for the spool 17 are arranged in plates 23 and 24. These plates are screwed to the pole pieces 10 and 11 as well as plate 21 so that it will be noted that all of the various parts of the device are connected with the pole pieces and not with the magnet 9, except the pole pieces themselves. The springs 19 and 20 not only act as means for normally maintaining the arm 5 in position, shown in Figs. 1 and 3, but also act as conductors for current from battery 25. The springs may be connected to the spool 17 in any desired way, but insulated therefrom so that the winding 18 will receive properly the current from the battery. In adjusting the reciprocating member 22 connected with spring 20 the same is prevented from rotation by having a guiding member 26 extend through an apertured projection which permits a proper reciprocation of member 22 but positively prevents any rotation thereof.

In use the unknown resistance 27 is connected to binding posts 28 and 29 while the battery 25 is connected to binding posts 30 and 31. In connection with the battery 25 it may be stated that a battery of any voltage may be used with proper changes or variations in the instrument. Ordinarily two or three volts would be the proper amount for a meter designed to indicate or measure the ohmic resistance of a device up to about 60 ohms. Any higher number of ohms must be measured by an instrument designed to use a greater voltage but constructed in a similar manner to the device just described. When it is desired to know the ohmic resistance of the resistance 27 a battery 25 is connected with binding posts 30 and 31 preferably of, say two volts. When this has been done the switch 8 is moved until the same contacts with button 32. Current will then flow from battery 25 to binding post 30, through wire 33, spring 19, winding 18, spring 20, reciprocating member 22, wire 34, which is connected with reciprocating member 22, wire 35, button 32, switch 8, wire 36, binding post 31, and from thence back to battery 25. This will cause the arm 5 to swing from its normal position on the right to zero or possibly past zero. If the arm swings past zero thumb screw 7 is moved until spring 20 has been brought under such tension as to bring the arm 5 back exactly to zero. If the arm does not swing quite back to zero the thumb screw is adjusted to relieve the tension of spring 20 so that the arm 5 may move to zero. When arm 5 has been thus adjusted to zero switch 8 is moved from button 32 to button 37. This will cause the current from wire 34 to pass into binding post 28 through resistance 27, binding post 29, and wire 38 to button 37, and from thence through switch 8, wire 36, and binding post 31, back to battery 25. As will be noted before the resistance 27 was switched into the circuit the field and the magnetic flux of the winding 18 and the tension of springs 19 and 20 were balanced or under such tension as to hold the arm 5 at zero with the voltage produced by battery 25. Upon switching resistance 27 into the circuit the voltage was not changed nor the other resistances of the circuit, nor the tension of the respective springs so that the decreased amperage in winding 18 caused by the extra resistance of the circuit will permit the springs to move arm 5 from zero toward the right. At the point the arm 5 stops will indicate the ohmic resistance of resistance 27.

If a different resistance than 27 is desired to be tested switch 8 is moved back to button 32 and a new resistance substituted for resistance 27 after which switch 8 is moved again into contact with button 37. This will cause arm 5 to move across the index and indicate the ohmic resistance of the new resistance inserted. If for any reason the battery having more or less voltage than battery 25 is desired to be used the same may be freely used upon proper adjustment of the spring 20. For instance, if a battery having three volts is desired to be used instead of two volts the new battery is connected with binding posts 30 and 31 in the usual manner and switch 8 is moved over into contact with button 32. This will cause arm 5 to swing over past zero and probably against the magnet 9. The thumb screw 7 is then operated for adjusting the tension of spring 20 until spring 20 has drawn or moved back arm 5 to zero. The device is then in condition for testing various resistances, the voltage used being the three volts of the new battery. The results will be the same as the increased tension of spring 20 will give an increased resistance to the increased magnetic flux of winding 18.

What I claim is:

1. In a meter of the class described, a galvanometer structure comprising a magnet, an armature, and an indicating arm, a spring for holding the arm in a predetermined position, a reciprocating member connected with one end of said spring and designed to vary the tension thereof, a rotating screw engaging said operating member for reciprocating the same, a circuit including a source of current for causing the indicating arm of the galvanometer structure to be moved from the position in which it is held by said spring, and means for switching an unknown resistance in said circuit for varying the deflection of said arm.

2. In a meter of the class described, a galvanometer structure including an indicating arm, a coil, an electrical circuit including said coil, and a source of current for shifting the position of said arm, an adjustable mechanical device for moving the arm to zero while influenced by the current, and means for switching into said circuit in series an unknown resistance which will add to the resistance of the circuit and will consequently reduce the amperage passing through said coil, whereby said arm will be permitted to move back from its original position for indicating the amount of resistance inserted in the circuit.

3. In a meter of the class described, a galvanometer structure including an actuating coil, and an indicating arm, a spring for normally holding said arm in a certain position, an electrical circuit including said coil, and a source of current for shifting said arm and coil against the action of said spring, means for placing said spring under increased tension for bringing said coil and arm back to a predetermined position, and means for inserting an unknown resistance into said electrical circuit, said insertion being in series, whereby the resistance of said unknown resistance is added to said circuit, whereby the amperage in said coil will be lowered and the tension of said spring permitted to shift said arm for indicating the amount of resistance added to the circuit.

4. In a meter of the class described, a galvanometer structure, an electrical circuit in series with the winding of said galvanometer structure, means for switching an unknown resistance in said circuit in series, a spring for normally holding the indicating arm of said galvanometer structure in a predetermined position, a reciprocating member formed with a projection connected to said spring, a rotating manually operated screw arranged to project beyond the galvanometer structure, said rotating screw engaging said reciprocating member for moving the same, and a guide engaging said projection for preventing the rotation of said reciprocating member when said screw is rotated.

In testimony whereof I affix my signature in presence of two witnesses.

THOMAS WILLIAM BIBB.

Witnesses:
BESS BOHRER,
J. W. GALLOWAY.

---

Copies of this patent may be obtained for five cents each, by addressing the "Commissioner of Patents. Washington, D. C."